No. 863,975. PATENTED AUG. 20, 1907.
W. M. FITZWATER.
BALING PRESS.
APPLICATION FILED APR. 7, 1906.
2 SHEETS—SHEET 2.
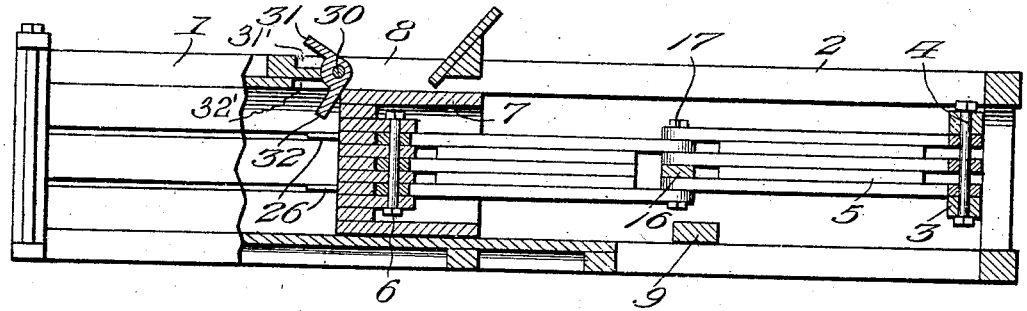
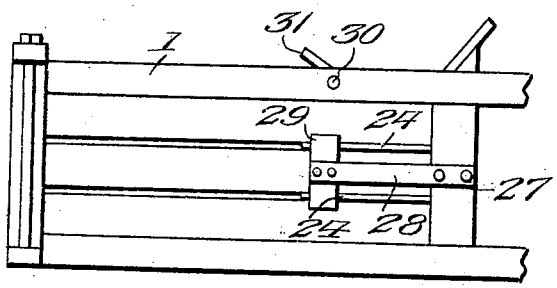
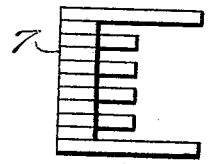
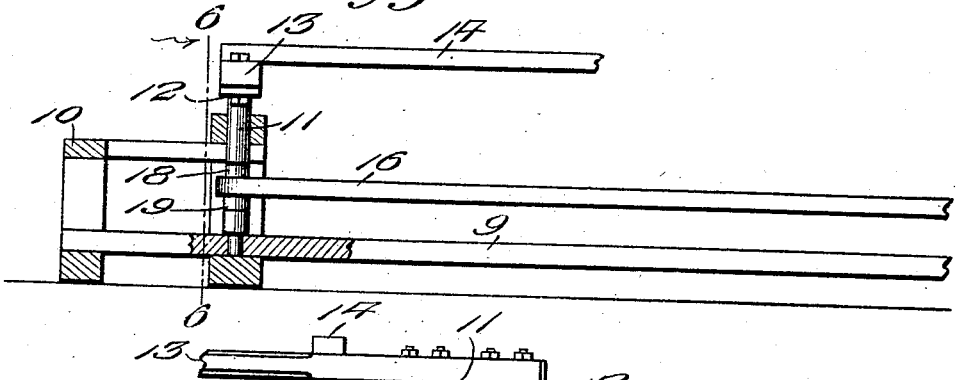
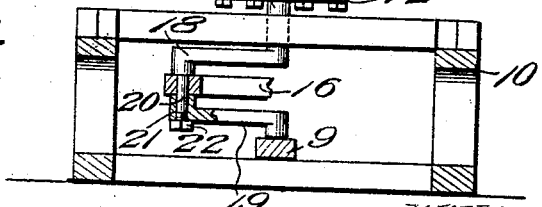
Witnesses
Edwin G. McKee
J. A. Elmore
Inventor
William M. Fitzwater
By Victor J. Evans
Attorney
THE NORRIS PETERS CO., WASHINGTON, D. C.

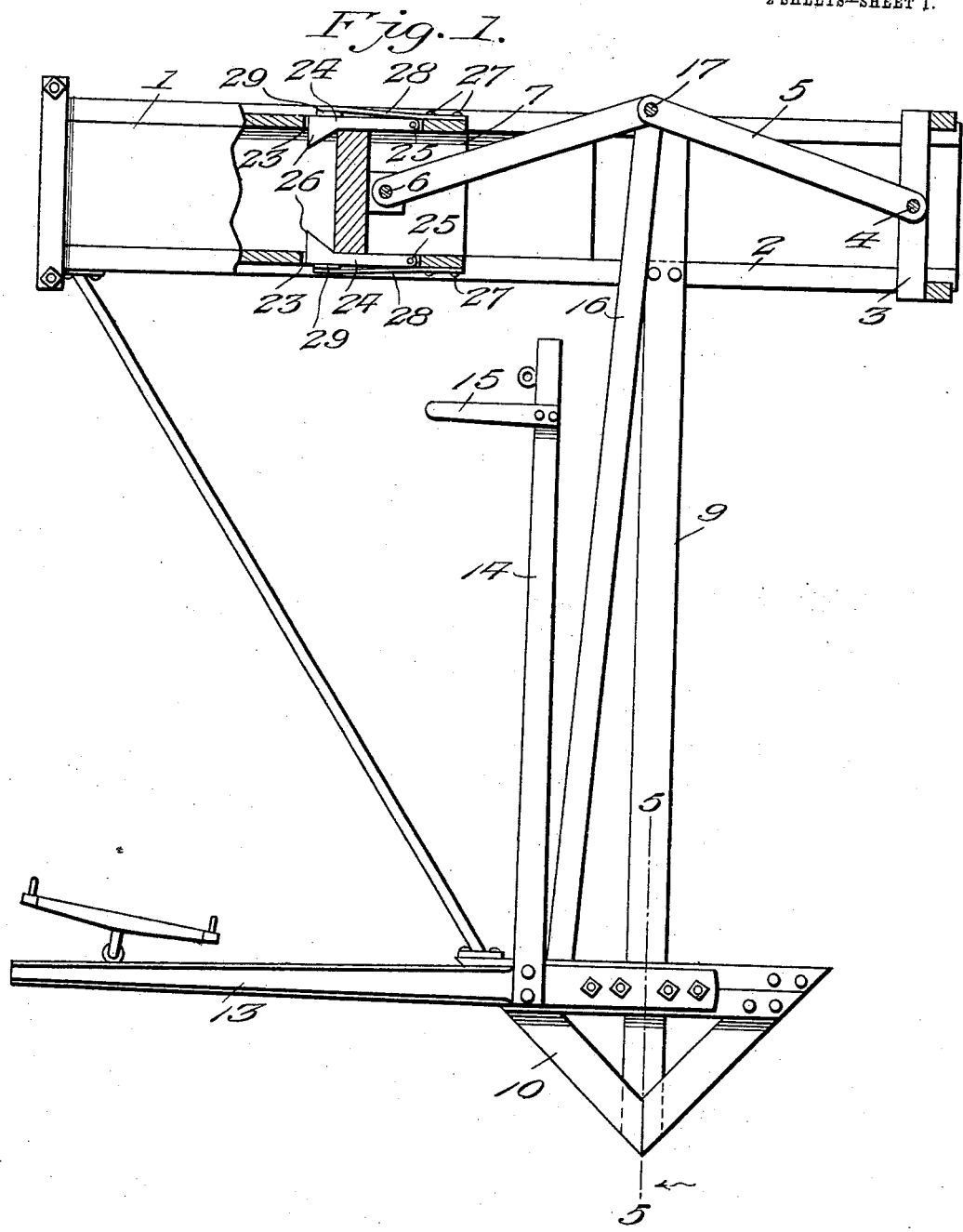

UNITED STATES PATENT OFFICE.

WILLIAM M. FITZWATER, OF GREGORY, GEORGIA.

BALING-PRESS.

No. 863,975.	Specification of Letters Patent.	Patented Aug. 20, 1907.

Application filed April 7, 1906. Serial No. 310,546.

*To all whom it may concern:*

Be it known that I, WILLIAM M. FITZWATER, a citizen of the United States, residing at Gregory, in the county of Murray and State of Georgia, have invented certain new and useful Improvements in Baling-Presses, of which the following is a specification.

My invention has relation to improvements in baling presses, and it consists in the construction and arrangement of parts, as will be hereinafter described and particularly claimed.

In the accompanying drawings: Figure 1 is a top plan view partly in horizontal section of a baling press embodying the invention. Fig. 2 is a side elevation, partly in vertical, longitudinal section, of the same. Fig. 3 is a detail side elevation of the baling box. Fig. 4 is a detail view of the plunger. Fig. 5 is a detail view, partly in vertical section, the section being taken on the line 5—5 of Fig. 1. Fig. 6 is a detail sectional view taken on the line 6—6 of Fig. 5.

Referring to the drawings, 1 designates a baling box or chamber mounted at one end of and sustained by an elongated skeleton frame 2 provided at its forward end with a pair of vertically spaced transverse timbers 3 to which is pivoted by means of a vertical pintle or bolt 4 the forward end of a toggle lever 5, the other end of which is pivotally connected by a member or bolt 6 with a baling block or plunger 7, arranged for reciprocation in the box or chamber 1 which is provided at its forward end with a feed opening or mouth 8.

Disposed at one side of and at a point suitably remote from the frame 2 and connected therewith by means of a beam or timber 9 is a supporting frame 10 having journaled therein a vertical power shaft 11 having fitted upon its upper end a head plate 12, to which is bolted a draft beam or lever 13 to which the draft animal is to be hitched, as usual, there being attached to said lever at a point adjacent its inner end a perpendicularly disposed member or beam 14 provided at its outer end with an arm 15 to be engaged by a yoke strap for preventing the lever 13 riding against the animals' legs, while pivoted at one end to the crank portion of the shaft 11 is a bar or pitman 16 having its other end pivoted to the lever 5 by means of the hinge member or bolt 17 which pivotally connects the sections of said lever. The shaft 11 is preferably composed of a pair of sections 18, 19, of which the former is provided with a vertical, reduced portion or spindle 20 on which the outer end of the pitman 16 is fulcrumed and which extends through an opening 21 provided in the section 19 and has tapped onto its lower end a nut 22 for connecting the sections.

The side walls of the box 1 are provided with longitudinal slots 23 designed to receive retaining members or dogs 24 pivoted at their forward ends at 25 and provided at their rear, free ends with projecting engaging portions 26 which extend into the box within the path of the plunger 7, these dogs being arranged in vertically spaced relation and in pairs on opposite sides of the box, as seen in Figs. 2 and 3, while arranged respectively on opposite sides of the box and attached to the side walls thereof, as at 27, is a pair of leaf springs 28 each having at its free end a cross-piece or head 29 designed to bear upon and at the rear ends of the adjacent pair of dogs 24 for normally pressing the latter inward to engaging position.

Pivoted at the rear end of the feed opening 8, on a shaft 30 is a tucker plate having right angular arms 31 and 32, said arms having their ends so arranged that they engage recesses 31' and 32', formed in the upper and under sides of the top of the press box. The arm 31 serves to engage the recess 31' and acts as a stop, while the arm 32' serves to engage the recess 32 so that it will not interfere with the passage of the plunger 7.

In practice, during the operation of the lever 13 by the draft animal the power shaft 11 will be rotated and will, through the medium of its crank bend, reciprocate the pitman 16 for actuating the toggle lever 5 to in turn reciprocate the plunger 7 within the baling box, it being understood that the material to be baled will be fed into the box through the opening 8 in advance of the plunger. On the instroke of the plunger the portions 26 of the dogs 24 will be forced outward against the action of springs 28 for permitting the material to feed rearward in the box, while the member 31 will be actuated by the plunger to properly feed the material from above. On the outstroke of the plunger the member 31 will swing by gravity for bringing its side portion 32 into the path of the material and the dogs 24 will at the same time be pressed inward by the springs 28 for causing the engaging portions 26 to coöperate with the member 31 to prevent withdrawal of the material from the box under the action of the plunger.

It is to be noted that under the peculiar construction and operation of the parts the greatest amount of pressure will be exerted on the material at the completion of the instroke of the plunger, and further, that by forming the shaft 11 in vertical sections the pitman 16 may be readily connected therewith.

Having thus described my invention, what I claim is:

1. The combination in a baling press, a baling box having recesses formed in the upper and under sides of the top, a plunger for the baling box, means connected to said plunger for operating the same, a shaft, a right-angular tucker plate pivoted thereon having arms serving to contact with said recesses in the top of said baling box, substantially as specified.

2. A device of the character described comprising a baling box having a feed opening therein, and provided with a pair of vertical spaced slots in each of its side walls, a plunger arranged for movement longitudinally in the box, means for operating the plunger, retaining means arranged in pairs and pivoted in said slots and having engaging portions to project into the box, springs attached to the walls of the baling box, said springs each having a cross-piece to bear upon the adjacent pairs of retaining means, said baling box having recesses formed in the upper and lower faces of the top wall thereof, a shaft at the rear end of the feed opening having a tucker plate pivoted thereon provided with right angular arms, one of said arms adapted to swing into the upper recess and serving as a stop, the other arm serving to swing into the lowered recess to permit of the passage of the plunger, substantially as specified.

In testimony whereof I affix my signature in presence of two witnesses.

WILLIAM M. FITZWATER.

Witnesses:
J. W. THOMPSON,
R. H. KEITH.